United States Patent
Oldfield

(10) Patent No.: US 8,603,957 B2
(45) Date of Patent: Dec. 10, 2013

(54) LUBRICATING COMPOSITION COMPRISING A POLYESTER DISPERSANT

(75) Inventor: Andrew S Oldfield, Reading (GB)

(73) Assignee: Croda International PLC, Goole, North Humberside (GB)

( * ) Notice: Subject to any disclaimer, the term of this patent is extended or adjusted under 35 U.S.C. 154(b) by 74 days.

(21) Appl. No.: 11/791,076

(22) PCT Filed: Nov. 7, 2005

(86) PCT No.: PCT/GB2005/004282
§ 371 (c)(1),
(2), (4) Date: Feb. 26, 2008

(87) PCT Pub. No.: WO2006/054044
PCT Pub. Date: May 26, 2006

(65) Prior Publication Data
US 2009/0054281 A1   Feb. 26, 2009

(30) Foreign Application Priority Data
Nov. 19, 2004   (GB) .................................. 0425510.5

(51) Int. Cl.
*C10M 145/22* (2006.01)
*C10M 145/18* (2006.01)
*C10M 149/18* (2006.01)

(52) U.S. Cl.
USPC ........... 508/465; 508/459; 508/463; 508/454; 508/583

(58) Field of Classification Search
USPC ............... 44/342; 424/59; 508/465, 459, 463, 508/545, 583
See application file for complete search history.

(56) References Cited

U.S. PATENT DOCUMENTS

| | | | |
|---|---|---|---|
| 2,553,183 A * | 5/1951 | Caron et al. | .................... 44/342 |
| 4,936,866 A | 6/1990 | Gutierrez et al. | |
| 5,391,312 A | 2/1995 | Senaratne et al. | |
| 6,458,173 B1 | 10/2002 | Lin | |
| 2007/0264207 A1 * | 11/2007 | Tsuchikawa et al. | ........... 424/59 |

FOREIGN PATENT DOCUMENTS

| | | |
|---|---|---|
| CA | 1272182 | 7/1990 |
| EP | 0 265 254 A | 4/1988 |
| JP | 08-176583 | 7/1996 |
| JP | 08-283764 | 10/1996 |
| WO | WO0024503 | * 5/2000 |
| WO | WO2004053030 | * 6/2004 |

OTHER PUBLICATIONS

International Search Report dated Jan. 30, 2006 for PCT/GB2005/004282.

English translation of Examination Report mailed Oct. 4, 2011 in corresponding Japanese Application No. 2007-542080.

* cited by examiner

*Primary Examiner* — James Goloboy
*Assistant Examiner* — Chantel Graham
(74) *Attorney, Agent, or Firm* — Jones Day

(57) ABSTRACT

An automotive lubricant composition comprising a base fluid and an ashless polymeric dispersant is claimed. The ashless polymeric dispersant has a number average molecular weight of between 500 and 10,000 and comprises a polar tail group which itself comprises a polymeric backbone of 2 to 30 monomeric repeat units, each repeat unit comprising a hydrocarbon chain functionalised by the presence of at least one electronegative element or moiety, the tail group being linked to a polar head group which comprises a polar moiety selected from at least one of acid, ester, amide or alcohol moieties. The dispersant has good dispersancy properties, when used as a sole dispersant or in combination with other dispersants. It provides enhanced seal resistance and has good oxidative stability in automotive applications as compared to current commercial products. Furthermore the low temperature viscosity of the automotive lubricant composition with the designed dispersant is superior to that of a composition with current commercial dispersants and the designed dispersant does not react with ZDDP and reduce the antiwear capabilities of ZDDP.

20 Claims, 2 Drawing Sheets

LUBRICATING COMPOSITION COMPRISING A POLYESTER DISPERSANT

CROSS REFERENCE TO RELATED APPLICATION

This application is the National Phase application of International Application No. PCT/GB2005/004282, filed 7 Nov. 2005, which designates the United States and was published in English. This application, in its entirety, is incorporated herein by reference.

The present Invention relates to an automotive lubricant composition comprising a base fluid and an ashless polymeric dispersant.

For automotive applications all functions performed by the lubricant base fluid and the range of additives are important. The suspending of insoluble contaminants and keeping surfaces clean are critical additive functions, which are undertaken by the combined presence of detergents and dispersants. The dispersant typically has a higher molecular weight than the "soap part" of the detergent so it is more effective in fulfilling the suspending and cleaning requirements.

In automotive engine oils dispersants can suspend insoluble contaminants in the lubricant base fluid in a variety of ways in order to reduce engine oil viscosity build up due to soot, reduce engine sludge and reduce deposit formation on engines. Dispersants are key additives in transmission fluids to control sludge build up derived from extensive lubricant base fluid oxidation as certain parts of the transmission are at very high temperatures. Dispersants can also be used in gear oils. Gear oils typically contain thermally labile extreme pressure additives, which can decompose to form highly polar byproducts. Dispersants are used to contain these byproducts to avoid corrosion and deposit formation.

As described above the primary function of the dispersant is to disperse soot, deposit precursors and deposits. However dispersants require other properties in order to perform effectively. These properties include thermal and oxidative stability, good low temperature properties, i.e. maintenance of low viscosity, and maintenance of the integrity of seals in the automotive equipment. Also they must not interfere with the activity of other additives that may be present in the automotive lubricant composition.

A dispersant, which has poor thermal stability, will break down, thereby losing its ability to associate with and suspend potentially harmful products. A dispersant, which has poor oxidative stability, will itself contribute towards deposit formation and oil thickening.

The combination of the amount of dispersant present in automotive lubricant compositions (for example up to 20% in automotive engine oils) and the fact that it is often the highest molecular weight additive apart from the viscosity index improver can alter the viscosity of the lubricant composition. A boost in viscosity at high temperatures is desired but at low temperatures it is a disadvantage. Automotive engine oils require low to moderate viscosities for cranking viscosity and pumping viscosity during cold weather operation. It is important to have good low temperature properties of an automotive lubricant composition for ease of cold cranking, good lubricant circulation and fuel economy. For automotive applications fuel economy is an important factor.

Seals in automotive equipment are used for many purposes, in particular to enable access to malfunctioning parts to perform repair, to minimise contamination and the loss of lubricant and to join parts together which are vibrating or parts which could expand or contract when exposed to differing temperatures. Therefore maintenance of the integrity of the seals, which can fail by shrinking, elongation or becoming brittle, is crucial to the on-going performance of the automotive equipment. Dispersants are often implicated as additives most likely to cause seal damage although this can be alleviated to some extent by the addition of seal swell agents.

Dispersants that are currently commercially available typically consist of a non-polar hydrocarbon chain tail group linked to a connecting group which is linked to a polar head group. Typically the polar group associates with the polar particles and the non-polar group keeps these particles suspended in the bulk lubricant solution. One of the most prevalent of these types of dispersants is polyisobutylene succinimide which is derived from the reaction of polyisobutylene with maleic anhydride followed by reaction with a polyalkylenepolyamine. Such products are known to have good dispersancy properties but cause damage to seals. Also such products have been known to form stable complexes with zinc dialkyldithiophosphate (ZDDP), which is often present in automotive lubricant compositions as an antiwear additive, thus reducing the effectiveness of the antiwear additive.

The present inventors have designed a dispersant for use with a lubricant base fluid in automotive applications that has good dispersancy properties, when used as a sole dispersant or in combination with other dispersant (s). The dispersant provides enhanced seal resistance and has good oxidative stability in automotive applications as compared to current commercial products. Furthermore the low temperature viscosity of the automotive lubricant composition with the dispersant is superior to that of a composition with current commercial dispersants and the dispersant does not react with ZDDP and reduce the antiwear capabilities of ZDDP.

According to the present invention an automotive lubricant composition comprising a base fluid and 0.001 to 20% by weight of a polymeric ashless dispersant having a number average molecular weight of between 500 and 10,000, the dispersant comprising a polar tail group which comprises a polymeric backbone of 2 to 30 monomeric repeat units, each repeat unit comprising a hydrocarbon chain functionalised by the presence of at least one electronegative element or moiety, the tail group being linked to a polar head group which comprises a polar moiety selected from at least one of acid, ester, amide or alcohol moieties.

Base Fluid

Figure 1:
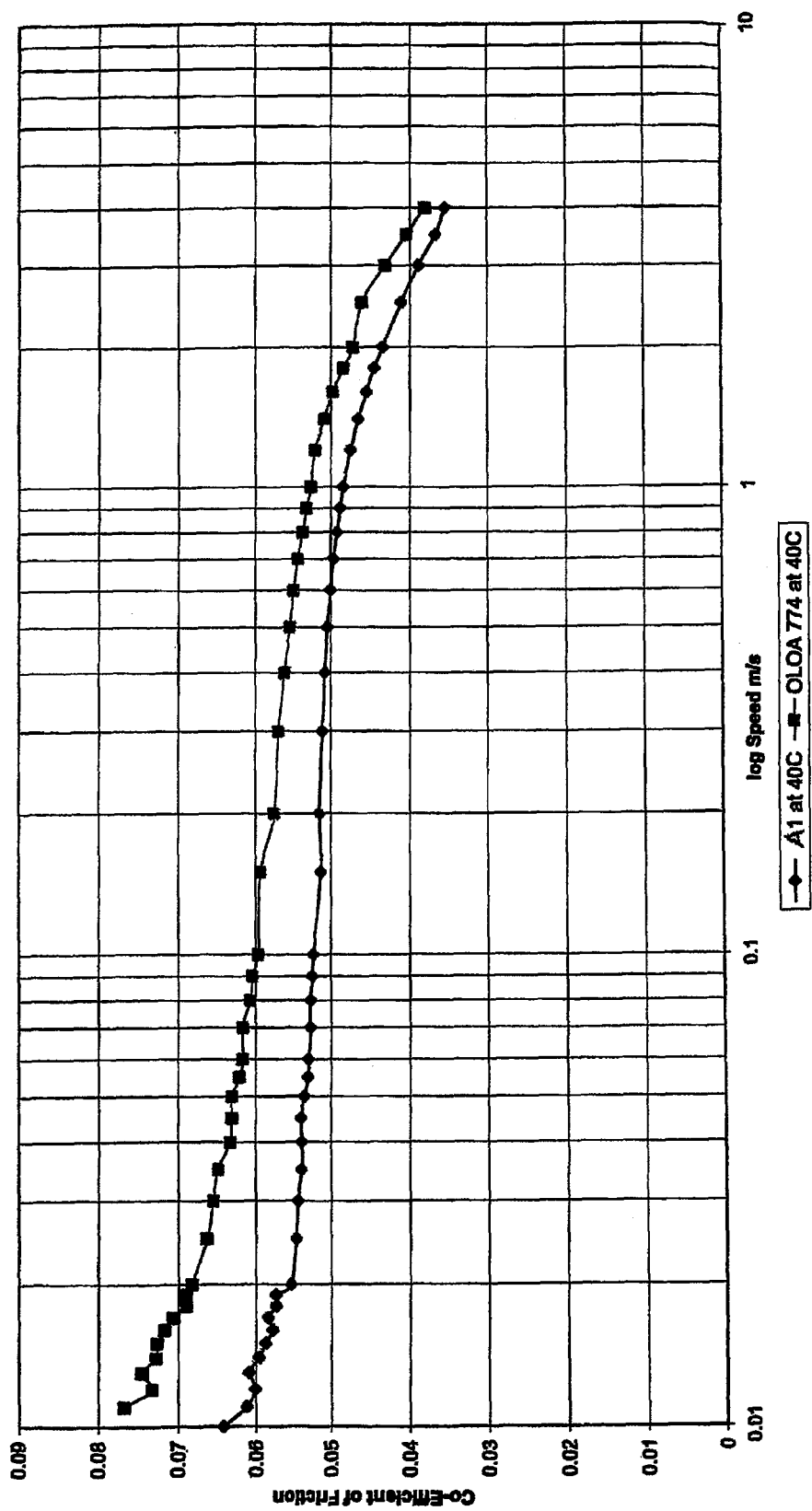
FIG. 1 is a graphic presenting the experimental results of Table 5 (co-efficient of friction vs. speed) as described in the Examples herein.
Figure 2:
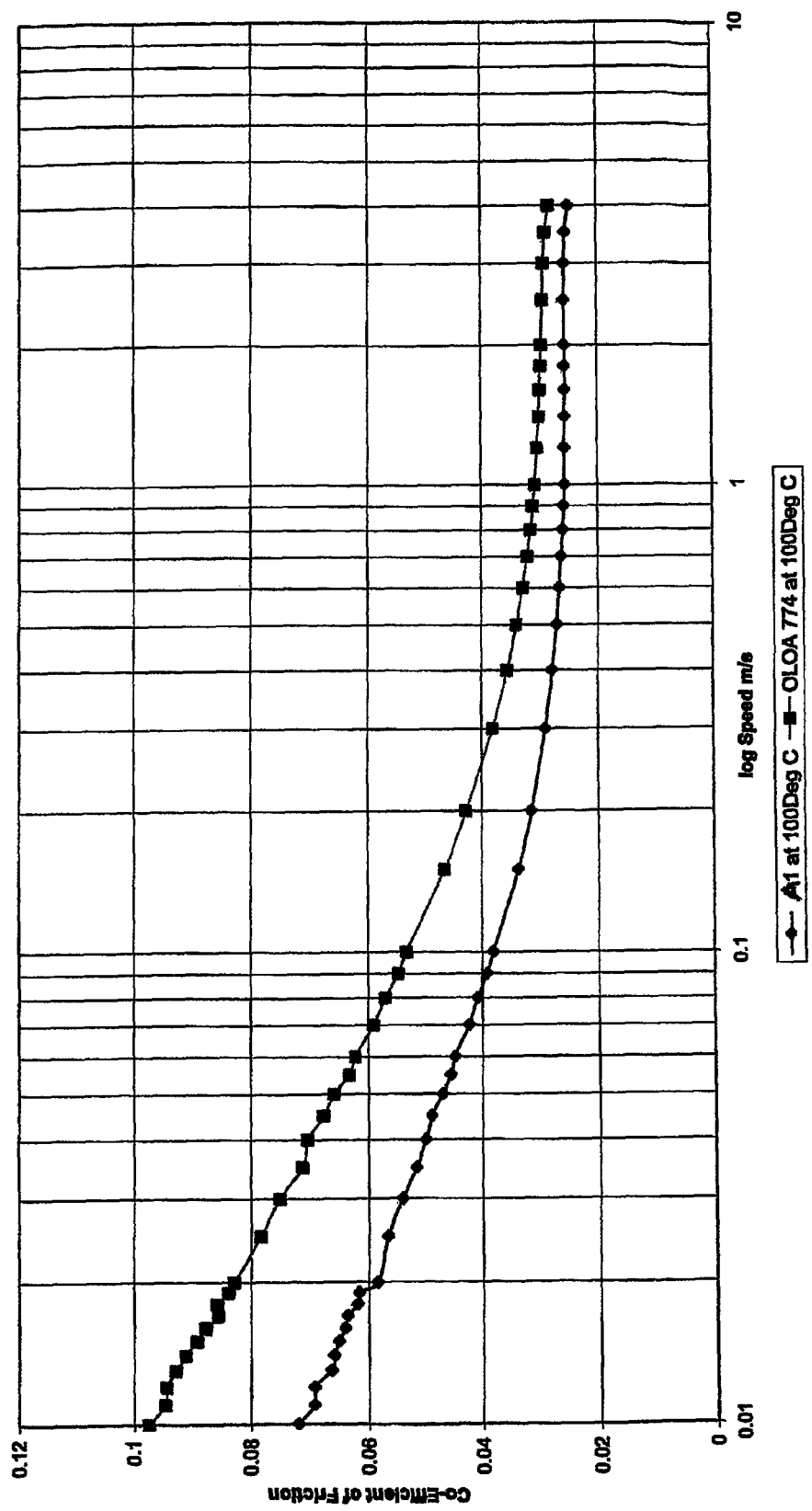
FIG. 2 is a graphic presenting the experimental results of Table 6 (co-efficient of friction vs. speed) as described in the Examples herein.

The term base fluid includes engine oil, transmission oil and fuel. The term engine oil includes both gasoline and diesel four stroke (including heavy duty diesel) engine oils. The engine oil may be chosen from any of the Group I to Group VI base oils as defined by the American Petroleum Institute (API) or a mixture thereof. Preferably the engine oil has not more than 20%, more preferably not more than 10% of Group I base oil. Preferably the engine oil has not more than 50% of Group V base oil. The viscosity of the four stroke engine oil at 100° C. is from 3 to 15 cSt, preferably 4 to 8 cSt. The viscosity index is preferably at least 90 and more preferably at least 105. The Noack volatility, measured according to ASTM D-5800, is preferably less than 20%, more preferably less than 15%.

The term engine oil also includes two stroke engine oil. A particularly preferred two stroke engine oil is a Group I base oil, specifically polyisobutylenes. Other preferred two stroke engine oils include some Group V base oils, for example esters and vegetable oil.

Transmission oil includes automatic, gear, rear axle and continuously variable. Preferably preferred transmission oils are Group II to Group VI, in particular high viscosity polyalphaolefin and highly refined mineral oils.

Fuel includes both gasoline and diesel fuel. Preferably the gasoline fuel should meet EN 228 standard and the diesel fuel should meet EN 590 standard.

Preferably the base fluid is an engine oil, more preferably a four stroke engine oil.

Ashless Polymeric Dispersant

The tail group of the dispersant is a polar group. It exhibits a level of polarity such that it is soluble in the combination of chosen base fluid with other polar additives that may be present in the automotive lubricant composition.

Each monomeric repeat unit of the polymeric backbone comprises a hydrocarbon chain functionalised by the presence of at least one electronegative element or moiety. The hydrocarbon chain may be a saturated or unsaturated, preferably saturated aliphatic chain. The hydrocarbon chain may be straight chained or branched. It is preferably branched. It is preferably a divalent radical. It preferably contains from 8 to 35, more preferably 10 to 25 and especially 12 to 20 carbon atoms. Preferably the electronegative element or moiety is chosen from oxygen, ester (defined as —COO—), and amide (defined as —CONH—). More preferably the electronegative element or moiety is chosen from oxygen or ester and especially ester. Preferably the electronegative element or moiety is in the backbone of the monomeric repeat unit rather than being a pendant group. An especially preferred monomeric repeat unit is where the hydrocarbon chain is $CH_3—(CH_2)_5—CH—(CH_2)_{10}—$ and the electronegative element or moiety is ester.

The number of monomeric repeat units ranges from 2 to 30, preferably 2 to 20 and more preferably 3 to 15.

The tail group is linked at one end, directly or indirectly, preferably directly to a polar head group which comprises a polar moiety selected from at least one of acid, ester, amide or alcohol moieties. Preferably the polar moiety is an acid or amide moiety. The polar group is chosen such that it is able to associate with the particles to be dispersed in the automotive lubricant composition. The polar moiety is chosen such that its polarity does not render the polymeric ashless dispersant insoluble in the chosen base fluid with additives.

The other end of the tail group is terminated with a chain terminating group. The precise structure of the chain terminating group is not critical provided it is inert to other components of the composition under the normal processing conditions to which it is subjected. Preferably it has a molecular weight of less than 800, more preferably less than 500 and especially less than 300. Preferably it contains only carbon, hydrogen and oxygen atoms.

A preferred dispersant is derived from the polyesterification of a hydroxyalkyl acid, where the alkyl group has from 8 to 35 carbon atoms, preferably 10 to 25 and especially 12 to 20 carbon atoms. An especially preferred hydroxyalkyl acid is 12-hydroxystearic acid. In this case the chain terminating group of the tail group is derivable from the hydroxyalkyl acid itself or from the non-hydroxyl analogue of the hydroxy acid which is generally present in the commercial grades of the hydroxy acids available. The chain terminating group can also be derived from any convenient acid that may be added to the polyesterification reaction mixture. Such convenient acids include saturated or unsaturated, preferably saturated monocarboxylic acids having 12 to 22 carbon atoms. A specific example is isostearic acid. The polar head group of this preferred dispersant comprises an acid grouping.

The polyesterification may be performed by heating the hydroxyalkyl acid, optionally in the presence of the chain terminating group, preferably in the presence of an esterification catalyst, such as tetrabutyl titanate, zirconium naphthenate, zinc acetate or toluene sulphonic acid, at a temperature between 100 and 300° C. The water formed in the esterification reaction is preferably removed from the reaction medium, and this can be done by passing a stream of nitrogen through the reaction mixture or carrying out the reaction in the presence of a solvent, for example xylene or toluene, and distilling off the water as it is formed.

The % weight of ashless polymeric dispersant in the automotive lubricant composition when the base fluid is an engine oil is preferably 1 to 20%. The % weight of ashless polymeric dispersant in the automotive lubricant composition when the base fluid is a transmission oil is preferably 0.1 to 5%. The % weight of ashless polymeric dispersant in the automotive lubricant composition when the base fluid is a fuel is preferably 0.001 to 1%.

The dispersant has a number average molecular weight of between 500 and 10,000, preferably 500 to 7,000, more preferably 500 to 5,000 and especially 700 to 3,000. The number average molecular weight of the polymer can be determined by many techniques. Gel permeation chromatography (GPC) is a well known technique that has been employed to determine the number average molecular weight for the dispersant of the invention.

The automotive lubricant composition may further comprise a surfactant additive. Preferably the surfactant additive has at least one alkoxylated or at least one ester moiety. Preferably the surfactant additive has not more than 40 carbon atoms. Especially preferred esters are derived from the reaction of a polyol, having from 2 to 8 hydroxyl groups with an aliphatic, straight chained or branched, saturated or unsaturated monocarboxylic acid having from 8 to 24 carbon atoms. Examples of especially preferred esters include sorbitan monolaurate, sorbitan monopalmitate, sorbitan monostearate, sorbitan tristearate, sorbitan monooleate and sorbitan trioleate. The % weight of surfactant additive with respect to the % weight of the ashless polymeric dispersant is 0.1 to 20%, preferably 1 to 15%.

Other known dispersants may be present in the automotive lubricant composition at a level of up to 20%, preferably up to 10% by weight. For example OLOA 774, a commercial dispersant, which is polyisobutylene succinimide available ex Chevron Oronite.

When the base fluid is a four stroke engine oil the automotive lubricant composition also comprises other types of additives of known functionality at levels between 0.1 to 30%, more preferably between 1 to 20% more especially between 2 to 15% of the total weight of the automotive lubricant composition. These can include oxidation inhibitors, corrosion inhibitors, rust inhibitors, friction modifiers, foam depressants, pour point depressants, viscosity index improvers, antiwear agents, extreme pressure agents, ash-containing detergents, metal deactivators, demulsifiers and mixtures thereof. Viscosity index improvers include polyisobubutenes, polymethacrylate acid esters, polyacrylate acid esters, diene polymers, polyalkyl styrenes, alkenyl aryl conjugated diene copolymers and polyolefins. Foam depressants include silicones and organic polymers. Pour point depressants include polymethacrylates, polyacrylates, polyacrylamides, condensation products of haloparaffin waxes and aromatic compounds, vinyl carboxylate polymers, terpolymers of dialkylfumarates, vinyl esters of fatty acids and alkyl vinyl ethers. Friction modifiers include amides, amines, molybdenum containing compounds and partial fatty acid esters of polyhydric alcohols. Ash-containing detergents include neutral and overbased alkaline earth metal salts of an acidic organic compound. Oxidation inhibitors include hindered phenols, sulphur containing compounds and alkyl diphenylamines. Antiwear agents include ZDDP, ashless and ash containing organic phosphorous and organo-sulphur compounds, boron compounds, and organo-molybdenum compounds. Metal deactivators include benzotriazoles, mercaptobenzimidiazoles, thiadiazoles, and tolutriazole derivatives. Extreme pressure agents include sulphurised esters, sulphurised olefins, diaryl disulphides, dialkyldithiophosphate esters, heavy metal naphthenates, ashless and ash containing dialkyldithiophosphates, ashless and ash containing dialkyldithiocarbamates, ashless and ash containing salts of phosphate esters, chlorinated waxes, complex esters, borate esters, and oil insoluble sheet structure compounds such as graphite and molybdenum disulphide suspensions. Demulsifiers include polyalkoxylated phenols, polyalkoxylated polyols, and polyalkoxylated polyamines.

Additives may include more than one functionality in a single additive.

When the base fluid is a two stroke engine oil the automotive lubricant composition also comprises other types of additives of known functionality at levels between 0.1 to 30%, more preferably between 0.5 to 20% more especially between 1 to 10% of the total weight of the automotive lubricant composition. These can include oxidation inhibitors, corrosion inhibitors, rust inhibitors, friction modifiers, foam depressants, pour point depressants, viscosity index improvers, lubricity agents, ash-containing detergents, and mixtures thereof. Viscosity index improvers include polyisobubutenes, polymethacrylate acid esters, polyacrylate acid esters, diene polymers, polyalkyl styrenes, alkenyl aryl conjugated diene copolymers and polyolefins. Foam depressants include silicones and organic polymers. Pour point depressants include polymethacrylates, polyacrylates, polyacrylamides, condensation products of haloparaffin waxes and aromatic compounds, vinyl carboxylate polymers, terpolymers of dialkylfumarates, vinyl esters of fatty acids and alkyl vinyl ethers. Friction modifiers include amides, amines, molybdenum containing compounds and partial fatty acid esters of polyhydric alcohols. Ash-containing detergents include neutral alkaline earth metal salts of an acidic organic compound. Oxidation inhibitors include hindered phenols, sulphur containing compounds and alkyl diphenylamines. Lubricity agents include fatty acids, bright stock, ZDDP, ashless and ash containing organic phosphorous and organo-sulphur compounds, boron compounds, sulphurised esters, sulphurised olefins, diaryl disulphides, dialkyldithiophosphate esters, ashless and ash containing dialkyldithiophosphates, ashless and ash containing dialkyldithiocarbamates, ashless and ash containing salts of phosphate esters, complex esters and borate esters.

When the base fluid is a transmission oil the automotive lubricant composition also comprises other types of additives of known functionality at levels between 0.1 to 30%, more preferably between 0.5 to 20% more especially between 1 to 10% of the total weight of the automotive lubricant composition. These can include oxidation inhibitors, corrosion inhibitors, rust inhibitors, friction modifiers, foam depressants, pour point depressants, viscosity index improvers, antiwear agents, detergents, metal deactivators, extreme pressure agents, demulsifiers and mixtures thereof. Viscosity index improvers include polyisobubutenes, polymethacrylate acid esters, polyacrylate acid esters, diene polymers, polyalkyl styrenes, alkenyl aryl conjugated diene copolymers and polyolefins. Foam depressants include silicones and organic polymers. Pour point depressants include polymethacrylates, polyacrylates, polyacrylamides, condensation products of haloparaffin waxes and aromatic compounds, vinyl carboxylate polymers, terpolymers of dialkylfumarates, vinyl esters of fatty acids and alkyl vinyl ethers. Friction modifiers include amides, amines, molybdenum containing compounds and partial fatty acid esters of polyhydric alcohols. Ash-containing detergents include neutral and overbased alkaline earth metal salts of an acidic organic compound. Oxidation inhibitors include hindered phenols, sulphur containing compounds and alkyl diphenylamines. Antiwear agents include ZDDP, ashless and ash containing organic phosphorous and organo-sulphur compounds, boron compounds, and organo-molybdenum compounds. Metal deactivators include benzotriazoles, mercaptobenzimidiazoles, thiadiazoles, and tolutriazole derivatives. Extreme pressure agents include sulphurised esters, sulphurised olefins, diaryl disulphides, dialkyldithiophosphate esters, heavy metal naphthenates, ashless and ash containing dialkyldithiophosphates, ashless and ash containing dialkyldithiocarbamates, ashless and ash containing salts of phosphate esters, chlorinated waxes, complex esters, borate esters, and oil insoluble sheet structure compounds such as graphite and molybdenum disulphide suspensions. Demulsifiers include polyalkoxylated phenols, polyalkoxylated polyols, and polyalkoxylated polyamines.

When the base fluid is a fuel the automotive lubricant composition also comprises other types of additives of known functionality at levels between 50 ppm to 5%, more preferably between 100 ppm to 3% more especially between 150 ppm to 2% of the total weight of the automotive lubricant composition. These can include cetane number improver, for example iso-octyl nitrate, octane number improver, for example oxygenated compounds such as methyltertiarybutyl ether, ashless detergent, for example Polyisobutylene monosuccinimide, lubricity additive, for example fatty acid and fatty acid esters, smoke suppressants, for example organometallic compounds, antifoam agents, for example organosilicone, de-icing additives, for example glycols, low temperature operability additives, for example polymeric wax, drag reducing additives, for example high molecular weight polymers, antioxidants, for example hindered phenols and aromatic amines, metal deactivators, for example benzotriazoles, corrosion inhibitors, for imidazolines, demulsifier and antihazing additives, for example polyalkoxylated polyols, friction modifiers, for example fatty acid esters, emulsifiers, for example partial esters of polyols, antistatic agents, for example glycerol esters and mixtures thereof.

According to a further embodiment of the invention use of an automotive lubricant composition comprising a base fluid and 0.001 to 20% by weight of a polymeric ashless dispersant having a number average molecular weight of between 500 and 10,000, the dispersant comprising a polar tail group which comprises a polymeric backbone of 2 to 30 monomeric repeat units, each repeat unit comprising a hydrocarbon chain functionalised by the presence of at least one electronegative element or moiety, the tail group being linked to a polar head group which comprises a polar moiety selected from at least one of acid, ester, amide or alcohol moieties in an engine or a transmission or a fuel supply line.

According to a further embodiment of the invention a method of enhancing seal resistance by introducing an automotive lubricant composition comprising a base fluid and 0.001 to 20% by weight of a polymeric ashless dispersant having a number average molecular weight of between 500 and 10,000, the dispersant comprising a polar tail group which comprises a polymeric backbone of 2 to 30 monomeric repeat units, each repeat unit comprising a hydrocarbon chain functionalised by the presence of at least one electronegative element or moiety, the tail group being linked to a polar head group which comprises a polar moiety selected from at least one of acid, ester, amide or alcohol moieties into an engine or a transmission or a fuel supply line.

According to a further embodiment use of a polymeric ashless dispersant having a number average molecular weight of between 500 and 10,000, the dispersant comprising a polar tail group which comprises a polymeric backbone of 2 to 30 monomeric repeat units, each repeat unit comprising a hydrocarbon chain functionalised by the presence of at least one electronegative element or moiety, the tail group being linked to a polar head group which comprises a polar moiety selected from at least one of acid, ester, amide or alcohol moieties in an engine or transmission oil or a fuel.

The dispersant for use with a lubricant base fluid in automotive application has good dispersancy properties for dispersion of soot, when used as a sole dispersant or in combination with other dispersants.

The dispersant provides enhanced seal resistance. The seal material has at tensile strength of at least 8, an elongation at break of at least 160% and no cracks when used in an automotive lubricant composition with a dispersant according to the invention.

The dispersant has good oxidative stability in automotive applications as compared to current commercial products. The dispersant has an oxidative induction time of at least 15 minutes at 210° C.

The low temperature viscosity of the automotive lubricant composition is superior to that of compositions comprising commercial dispersants. The automotive lubricant composition has a low temperature viscosity at −20° C. of not more than 15,000 cSt, preferably not more than 13,000 cSt.

The dispersant does not react with ZDDP and thus does not reduce the antiwear capability of ZDDP.

Automotive lubricant compositions having the dispersant present have lower coefficients of friction at both 40° C. and 100° C. than compositions containing current commercial dispersants.

The invention will now be described further by way of example only with reference to the following Examples.

EXAMPLE 1

Preparation of an Example of an Ashless Polymeric Dispersant A1

A 1 litre distillation rig fitted with a stirrer was charged with 600 g of commercial grade 12-hydroxystearic acid (12-HSA) at 80° C. under nitrogen. The temperature was then set to 190° C. 1.2 g of tetra butyl titanate being added once the temperature had exceeded 125° C. When the acid value reached 35 mg KOH/g the heat was removed and the reaction allowed to cool. The product poly-12-hydroxystearic acid was then filtered at 80° C.

EXAMPLE 2

The ability of the automotive lubricant composition of the invention to disperse soot deposits was measured according to the following experimental details. 20 mg of a mixture of an automotive lubricant composition for use in a four stroke engine and Vulcan XC72R carbon black, containing about 6% by weight carbon black was added to a polyethylene bottle containing 20 0.24 cm diameter stainless steel ball bearings and shaken for 1 hour. After allowing to stand for one hour the mixture was transferred to a Brookfield viscometer and the viscosity measured using a spindle with a fixed rotational speed of 50 revolutions per minute (rpm) (reading 1). The viscosity was then measured for an automotive lubricant composition without carbon black (reading 2). The absolute viscosity increase due to the presence of the carbon black was calculated as reading 1 minus reading 2.

The results are illustrated in Table One below. In each case the base fluid for the automotive lubricant composition is a mixture of Nexbase™ 3060 and Nexbase™ 3043 (colourless, catalytically hydroisomerised and dewaxed base oils comprising of hydrogenated, highly isoparaffinic hydrocarbons) with a standard additive package which includes 7% ashless dispersant (C9265 ex Infineum). OLOA 774 is a commercial dispersant, which is polyisobutylene succinimide available ex Chevron Oronite. The commercial dispersant contains about 36% active dispersant. The % in Table One are to added actual active dispersant.

TABLE ONE

| Added Polymeric ashless dispersant | Absolute Viscosity Increase (cP) |
|---|---|
| 0% | 1000 (Baseline for dispersant already present in base fluid) |
| 1% A1 | 397 |
| 3% A1 | 424 |
| 5% A1 | 438 |
| 7.5% A1 | 397 |
| 10% A1 | 450 |
| 1% OLOA 774 - Comparative | 413 |
| 3% OLOA 774 - Comparative | 319 |
| 5% OLOA 774 - Comparative | 261 |
| 7.5% OLOA 774 - Comparative | 280 |
| 10% OLOA 774 - Comparative | 351 |

The results in Table One Illustrate that an automotive lubricant composition having an ashless polymeric dispersant present according to the invention is at least as capable of dispersing soot particles as an automotive lubricant composition having a current commercial dispersant present.

EXAMPLE 3

Example 2 was repeated where a surfactant additive, 10% by weight, with respect to the ashless polymeric dispersant, of Span™ 60 (available ex Uniqema Limited), was added to the automotive lubricant composition having dispersant A1 present. The results are in Table Two below

TABLE TWO

| Polymeric ashless dispersant | Absolute Viscosity Increase (cP) |
|---|---|
| 1% A1 | 397 |
| 3% A1 | 424 |
| 5% A1 | 438 |
| 7.5% A1 | 397 |
| 10% A1 | 450 |
| 1% A1 + Span ™ 60 | 416 |
| 3% A1 + Span ™ 60 | 315 |
| 5% A1 + Span ™ 60 | 285 |
| 7.5% A1 + Span ™ 60 | 322 |
| 10% A1 + Span ™ 60 | 364 |

The presence of a surfactant additive according to the invention in the automotive lubricant composition enhances the dispersancy properties.

EXAMPLE 4

The automotive lubricant compositions as disclosed in Example 2, where the weight % of added dispersant is 5%, were subjected to the VW seal compatibility test according to PV 3344 where the seal material was an AK6 elastomer. The seal samples were immersed at 150° C. for 94 hours in the automotive lubricant composition. The automotive lubricant composition was replaced and the samples immersed for a further 94 hours. The automotive lubricant composition was then replaced again and the samples immersed for 94 hours for a third time. After this third immersion the tensile strength, elongation at break, number of cracks and change of seal hardness were measured. The results are shown in Table Three below.

TABLE THREE

| Dispersant (5 wt %) | Tensile Strength (Mpa) | Elongation at break (%) | Number of cracks | Change of seal Hardness |
|---|---|---|---|---|
| A1 | 8.8 | 199 | No cracks | +1 |
| OLOA 774 - comparative | 5.3 | 124 | Broke | +4 |
| Current Industry Standard for Acceptable Seals | >8 | >160 | No cracks | Not Applicable |

The results in Table Three illustrate that an automotive lubricant composition containing a dispersant according to the invention performs significantly better in seal tests than an automotive lubricant composition containing a current commercial dispersant product. Furthermore it meets the current industry standard for acceptable seals.

EXAMPLE 5

The oxidative stability of an ashless polymeric dispersant in an automotive lubricant composition as according to the invention was measured according to the following experimental details.

The induction time in minutes, i.e. the time up to when oxidation of the ashless polymeric dispersant starts, was measured by high pressure differential scanning calorimetry (HP-DSC) of an automotive lubricant composition using a Mettler DSC27HP with a Mettler TC 15 TA controller, under the following test conditions:
Start temperature: 30° C.
Heating rate: 1° C./min till test temperature of 210° C.
Air pressure: 34.5 bar Airflow: 100 ml/min
Sample quantity: 3+/−0.4 mg.
Crucible: Aluminium type, 40 µl.

The results are illustrated in Table Four below. In each case the base fluid for the automotive lubricant composition is as in Example 2.

TABLE FOUR

| Dispersant (5 wt %) | Oxidation Induction Time at 210° C. (mins) |
|---|---|
| A1 | 18 |
| OLOA 774 - comparative | 15 |

The results in Table Four illustrate that an ashless polymeric dispersant according to the invention is more oxidatively stable than a current commercial product.

EXAMPLE 6

The coefficient of friction of an automotive lubricant composition comprising 5% by weight of ashless polymeric dispersant as disclosed in Example 2 was determined at temperatures of 40 and 100° C. using a mini-traction machine (MTM) of a steel ball on a smooth steel disc. The load applied was 36N and the speed of rotation was varied from 0.01 m/s to 4 m/s to measure the Stribeck curve of the composition. The results are illustrated in Table Five below and Figure One for a temperature of 40° C. and Table Six and Figure Two for a temperature of 100° C.

TABLE FIVE

| Speed in m/s | Coefficient of friction for dispersant A1 | Coefficient of friction for comparative dispersant OLOA 774 |
|---|---|---|
| 4 | 0.03553 | 0.036627 |
| 3.5 | 0.03675 | 0.038033 |
| 3 | 0.038897 | 0.040477 |
| 2.5 | 0.041107 | 0.043123 |
| 2 | 0.043433 | 0.046023 |
| 1.8 | 0.044497 | 0.04716 |
| 1.6 | 0.045427 | 0.048363 |
| 1.4 | 0.046493 | 0.049753 |
| 1.2 | 0.04743 | 0.050827 |
| 1 | 0.04839 | 0.052057 |
| 0.9 | 0.04879 | 0.0526 |
| 0.8 | 0.049187 | 0.053163 |
| 0.7 | 0.049663 | 0.053703 |
| 0.6 | 0.050043 | 0.054333 |
| 0.5 | 0.050467 | 0.05493 |
| 0.4 | 0.050773 | 0.055423 |
| 0.3 | 0.051137 | 0.05614 |
| 0.2 | 0.0515 | 0.057007 |
| 0.15 | 0.05134 | 0.057533 |
| 0.1 | 0.052303 | 0.059317 |
| 0.09 | 0.052453 | 0.05962 |
| 0.08 | 0.05267 | 0.06037 |
| 0.07 | 0.052707 | 0.060653 |
| 0.06 | 0.052953 | 0.061653 |
| 0.055 | 0.05303 | 0.061637 |
| 0.05 | 0.053487 | 0.0621 |
| 0.045 | 0.053987 | 0.063043 |
| 0.04 | 0.05385 | 0.063113 |
| 0.035 | 0.05388 | 0.063317 |
| 0.03 | 0.054387 | 0.064937 |
| 0.025 | 0.054617 | 0.06557 |
| 0.02 | 0.05533 | 0.06634 |
| 0.019 | 0.057397 | 0.068277 |
| 0.018 | 0.057307 | 0.069007 |
| 0.017 | 0.05839 | 0.06898 |
| 0.016 | 0.057827 | 0.07064 |
| 0.015 | 0.058697 | 0.071737 |
| 0.014 | 0.05956 | 0.07268 |
| 0.013 | 0.060863 | 0.07276 |
| 0.012 | 0.06007 | 0.07463 |
| 0.011 | 0.061197 | 0.073287 |
| 0.01 | 0.06419 | 0.07678 |

TABLE SIX

| Speed in m/s | Coefficient of friction for dispersant A1 | Coefficient of friction for comparative dispersant OLOA 774 |
|---|---|---|
| 4 | 0.02484 | 0.02813 |
| 3.5 | 0.02533 | 0.02867 |
| 3 | 0.02553 | 0.029007 |
| 2.5 | 0.025517 | 0.029143 |
| 2 | 0.025507 | 0.02938 |
| 1.8 | 0.025493 | 0.029493 |
| 1.6 | 0.025423 | 0.029637 |
| 1.4 | 0.025477 | 0.0299 |

TABLE SIX-continued

| Speed in m/s | Coefficient of friction for dispersant A1 | Coefficient of friction for comparative dispersant OLOA 774 |
| --- | --- | --- |
| 1.2 | 0.025517 | 0.030123 |
| 1 | 0.02553 | 0.030533 |
| 0.9 | 0.025687 | 0.030943 |
| 0.8 | 0.025837 | 0.03136 |
| 0.7 | 0.026153 | 0.031907 |
| 0.6 | 0.026457 | 0.03271 |
| 0.5 | 0.026893 | 0.03388 |
| 0.4 | 0.02769 | 0.035417 |
| 0.3 | 0.02891 | 0.03798 |
| 0.2 | 0.031313 | 0.042797 |
| 0.15 | 0.033573 | 0.046553 |
| 0.1 | 0.03795 | 0.053367 |
| 0.09 | 0.039113 | 0.05477 |
| 0.08 | 0.040833 | 0.057037 |
| 0.07 | 0.0424 | 0.059123 |
| 0.06 | 0.044823 | 0.06223 |
| 0.055 | 0.04551 | 0.063347 |
| 0.05 | 0.046973 | 0.066027 |
| 0.045 | 0.048843 | 0.067753 |
| 0.04 | 0.050007 | 0.070397 |
| 0.035 | 0.051647 | 0.07129 |
| 0.03 | 0.054133 | 0.07518 |
| 0.025 | 0.056647 | 0.078353 |
| 0.02 | 0.05844 | 0.082767 |
| 0.019 | 0.0617 | 0.083787 |
| 0.018 | 0.061927 | 0.08568 |
| 0.017 | 0.063707 | 0.085433 |
| 0.016 | 0.064127 | 0.087607 |
| 0.015 | 0.065193 | 0.08904 |
| 0.014 | 0.065953 | 0.090903 |
| 0.013 | 0.066443 | 0.092627 |
| 0.012 | 0.06924 | 0.094297 |
| 0.011 | 0.06928 | 0.094513 |
| 0.01 | 0.07203 | 0.097427 |

The results in Tables Five and Six (and Figures One and Two) illustrate that an automotive lubricant composition containing an ashless polymeric dispersant according to the invention has a lower coefficient of friction in the boundary, mixed and film lubrication regimes as compared to an automotive lubricant composition containing a current commercial dispersant product at both high and low temperatures.

EXAMPLE 7

The viscosity of an automotive lubricant composition, where the base oil is as disclosed in Example 2, with 5% of dispersant added was measured at −20° C. using a SVM3000 Stabinger Viscometer. The results are illustrated in Table 7 below.

TABLE 7

| Dispersant | Viscosity (cSt) at −20° C. |
| --- | --- |
| A1 | 12,305 |
| OLOA 774 - comparative | Solid |

The invention claimed is:

1. An automotive lubricant composition comprising a Group V base oil and 0.001 to 20 wt % of a polymeric ashless dispersant having a number average molecular weight of between 500 and 10,000;
wherein:
  i) the dispersant is derived from the polyesterification of a hydroxyalkyl acid where the alkyl group has 8 to 35 carbon atoms;
  ii) the dispersant comprises a polar tail group which comprises a polymeric backbone of 2 to 30 monomeric repeat units;
  iii) each repeat unit comprises a hydrocarbon chain functionalised by the presence of at least one electronegative element or moiety; and
  iv) the tail group being linked to a polar head group comprising an acid moiety.

2. The automotive lubricant composition of claim 1, which further comprises a surfactant additive.

3. The automotive lubricant composition of claim 1, which further comprises other dispersants present at a level of up to 20% by weight.

4. The automotive lubricant composition of claim 1 wherein the base fluid is an engine oil and the polymeric ashless dispersant is present at 5 to 20% by weight.

5. The automotive lubricant composition of claim 4 which further comprises 0.1 to 30% of other additives.

6. The automotive lubricant composition of claim 1, wherein the hydroxyalkyl acid is 12-hydroxystearic acid.

7. The automotive lubricant composition of claim 1 wherein the polymeric ashless dispersant has a number average molecular weight of between 500 and 7,000.

8. A method of enhancing seal resistance by introducing the automotive lubricant composition of claim 1 into an engine or a transmission.

9. The automotive lubricant composition of claim 1, wherein the automotive lubricant composition is a two-stroke automotive lubricant composition.

10. The automotive lubricant composition of claim 1, wherein the automotive lubricant composition is a four-stroke automotive lubricant composition.

11. An automotive transmission lubricant composition comprising a Group IV base oil and 0.001 to 20 wt % of a polymeric ashless dispersant having a number average molecular weight of between 500 and 10,000;
wherein:
  i) the dispersant is derived from the polyesterification of a hydroxyalkyl acid where the alkyl group has 8 to 35 carbon atoms;
  ii) the dispersant comprises a polar tail group which comprises a polymeric backbone of 2 to 30 monomeric repeat units;
  iii) each repeat unit comprises a hydrocarbon chain functionalized by the presence of at least one electronegative element or moiety; and
  iv) the tail group being linked to a polar head group comprising an acid moiety.

12. The automotive lubricant composition of claim 11, further comprising a surfactant additive.

13. The automotive lubricant composition of claim 11, further comprising other dispersants present at a level of up to 20 wt %.

14. The automotive lubricant composition of claim 11, wherein the polymeric ashless dispersant is present at 5-20 wt %.

15. The automotive lubricant composition of claim 14, further comprising 0.1 to 30 wt % of other additives.

16. The automotive lubricant composition of claim 11, wherein the hydroxyalkyl acid is 12-hydroxystearic acid.

17. The automotive lubricant composition of claim 11, wherein the polymeric ashless dispersant has a number average molecular weight of between 500 and 7,000.

18. The automotive lubricant composition of claim 11, wherein the automotive transmission lubricant composition is a two-stroke automotive transmission lubricant composition.

19. The automotive lubricant composition of claim 11, wherein the automotive transmission lubricant composition is a four-stroke automotive transmission lubricant composition.

20. A method of enhancing seal resistance by introducing the automotive transmission lubricant composition of claim 11 into a transmission.

* * * * *